United States Patent [19]

Kazan

[11] 3,892,801

[45] July 1, 1975

[54] METHOD FOR PREPARING ALKALI SALTS OF P-METHYLAMINOBENZOYLGLUTAMIC ACID

[75] Inventor: John Kazan, Somerville, N.J.

[73] Assignee: American Cyanamid Company, Stamford, Conn.

[22] Filed: Sept. 11, 1974

[21] Appl. No.: 505,102

[52] U.S. Cl. .............................................. 260/518 R
[51] Int. Cl. ........................................... C07c 103/30
[58] Field of Search ................................ 260/518 R

[56] References Cited
OTHER PUBLICATIONS

Cosulich, I. T. et al., Journal of American Chemical Society, Vol. 70, (1948), page 1922 cited.

*Primary Examiner*—Lorraine A. Weinberger
*Assistant Examiner*—L. A. Thaxton
*Attorney, Agent, or Firm*—Ernest Y. Miller

[57] ABSTRACT

An improved method for preparing alkali salts of p-methylaminobenzoylglutamic acid by reacting p-nitro, or p-chlorobenzoylglutamic acid with an aqueous solution of methylamine in the presence of cuprous chloride at an elevated temperature to obtain the dimonomethylamine salt of p-methylaminobenzoylglutamic acid, converting the latter compound to an alkali salt and recovering said salt therefrom.

8 Claims, No Drawings

METHOD FOR PREPARING ALKALI SALTS OF P-METHYLAMINOBENZOYLGLUTAMIC ACID

BACKGROUND OF THE INVENTION

1. Field of the Invention

This invention relates to an improved method for preparing alkali salts of p-methylaminobenzoylglutamic acid.

The alkali salts of p-methylaminobenzoylglutamic acid prepared by the improved method of the present invention are illustrated by the following formula:

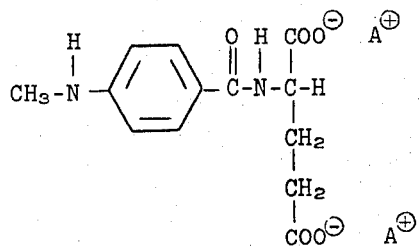

where $A^+$ represents a member selected from the group consisting of $Na^+$, $K^+$, $Ca^{++}$ 1/2 and $Ba^{++}$ 1/2. As used in the present invention, the term alkali is intended to include sodium, potassium, calcium and barium.

2. Description of the Prior Art

The preparation of the disodium salt of p-methylaminobenzoylglutamic acid by the aminolysis of sodium p-iodobenzoylglutamate with methylamine in the presence of copper powder is disclosed by Cosulich et al. in the Journal of American Chemical Society Vol. 70, 1922 (1948) and is outlined in Flow Sheet 1, hereinafter. In this method p-nitrobenzoyl chloride (I) is condensed with glutamic acid (II) in the presence of sodium hydroxide to give upon acidification p-nitrobenzoylglutamic acid (III). The product (III) is reduced with zinc and hydrochloric acid to form the zinc salt of p-aminobenzoylglutamic acid (IV) which is diazotized and reacted with potassium iodide to form p-iodobenzoylglutamic acid (V). The product (V) is autoclaved with methylamine in aqueous sodium hydroxide in the presence of copper powder to form the dimonomethylammonium salt of p-methylaminobenzoylglutamic acid, the autoclave is then cooled and vented; the reaction mixture is concentrated to remove excess methylamine and the concentrate is diluted with alcohol to precipitate the disodium salt of p-methylaminobenzoylglutamic acid (VI) which is isolated by filtration.

The following flowsheet I illustrates the above reactions:

FLOW SHEET I

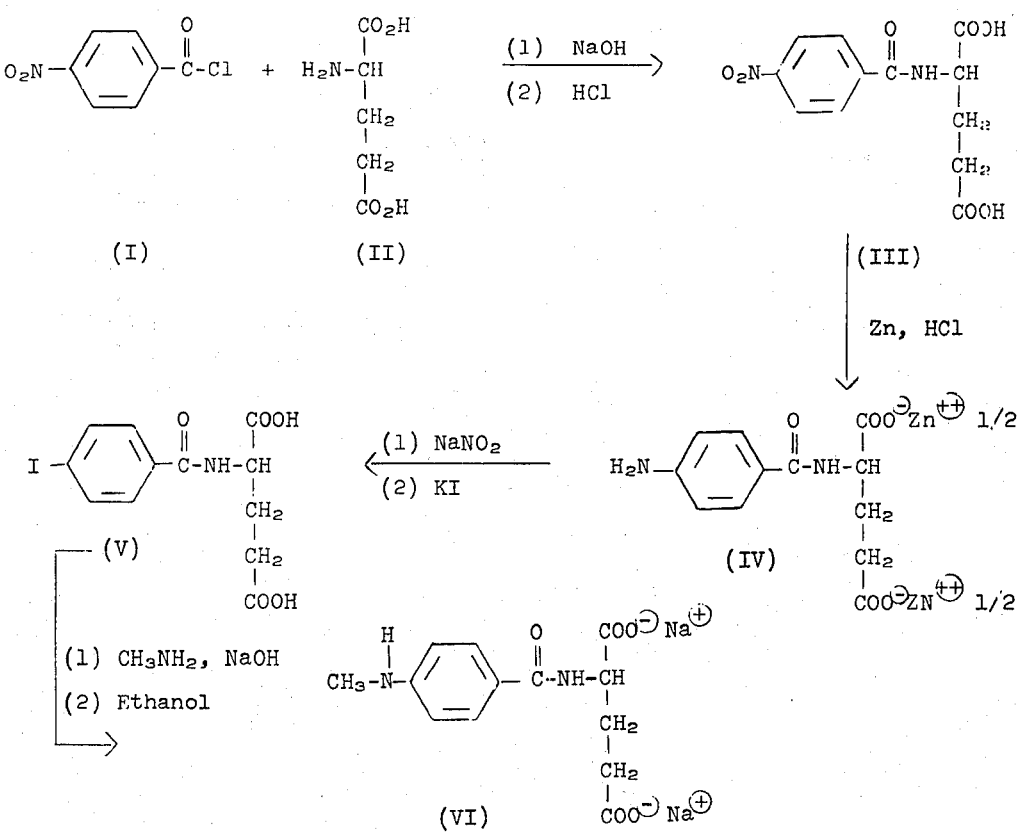

The final product (VI) may be used as an intermediate in the synthesis of N-{p-(((2,4-diamino-6-pteridinyl)-methyl]methylamino)benzoyl}glutamic acid, also known as 4-amino-$N^{10}$-methylpteroylglutamic acid, or methotrexate, a product which is useful for treating certain forms of cancer in humans.

SUMMARY OF THE INVENTION

An improved method has been found for preparing alkali salts of p-methylaminobenzoylglutamic acid as outlined in Flow Sheet II hereinafter. In this improved method, p-nitro, or p-chlorobenzoyl chloride (VII) is reacted with glutamic acid (II) in the presence of an aqueous alkalizing agent to prepare the dialkali salt of p-nitro, or p-chlorobenzoylglutamic acid which is converted by treatment with acid to p-nitro, or p-chlorobenzoylglutamic acid (VIII). The latter compounds can be converted to the alkali salt of p-methylaminobenzoylglutamic acid (VI), preferably the disodium salt of said acid, by aminolysis with methylamine in the presence of cuprous chloride and subsequent treatment with a suitable alkalizing agent.

The glutamic acid used as starting material to prepare compound (VIII) may be either the pure d or 1 form, or a d,l racemic mixture; alternatively salts of said d or l forms, or d, l racemic mixture, such as monopotassium l-glutamate, monosodium l-glutamate, monosodium d-glutamate, monopotassium l-glutamate, d,l-glutamate and the like, may also be used. The monosodium salt of l-glutamic acid is the preferred starting material used in the method of this invention. The reactions which take place in the improved process of the present invention can be illustrated as follows:

about 9.0 to about 9.5, at a temperature from about 20°C. to about 40°C., preferably from about 25°C. to about 30°C., for an additional period from about one-half to about 5 hours, preferably from about 1 to about 3 hours, after addition of the p-nitro, or p-chlorobenzoyl chloride to the alkali solution is completed. The reaction mixture is then treated with activated charcoal and filtered. The filtrate is diluted with water and acidified at a temperature of from about 15° to about 30°C., preferably at from about 18° to about 20°C., to a final pH of about 3. The precipitate is then filtered and dried to obtain compound (VIII). One mole of p-nitro, or p-chlorobenzoylglutamic acid (VIII) is autoclaved with from about 5 to about 15 moles, preferably from about 7 to about 7.5 moles, of methylamine in the presence of from about 0.2 to about 0.8 mole, preferably from about 0.3 to about 0.5 mole, of cuprous chloride at a temperature from about 115° to about 150°C., preferably from about 120° to about 130°C., for a period from about 5 to about 10 hours, preferably from about 6 to about 7 hours, to obtain p-methylaminobenzoylglutamic acid in situ as the dimonomethylamine salt. The reaction mixture is re-

FLOW SHEET II

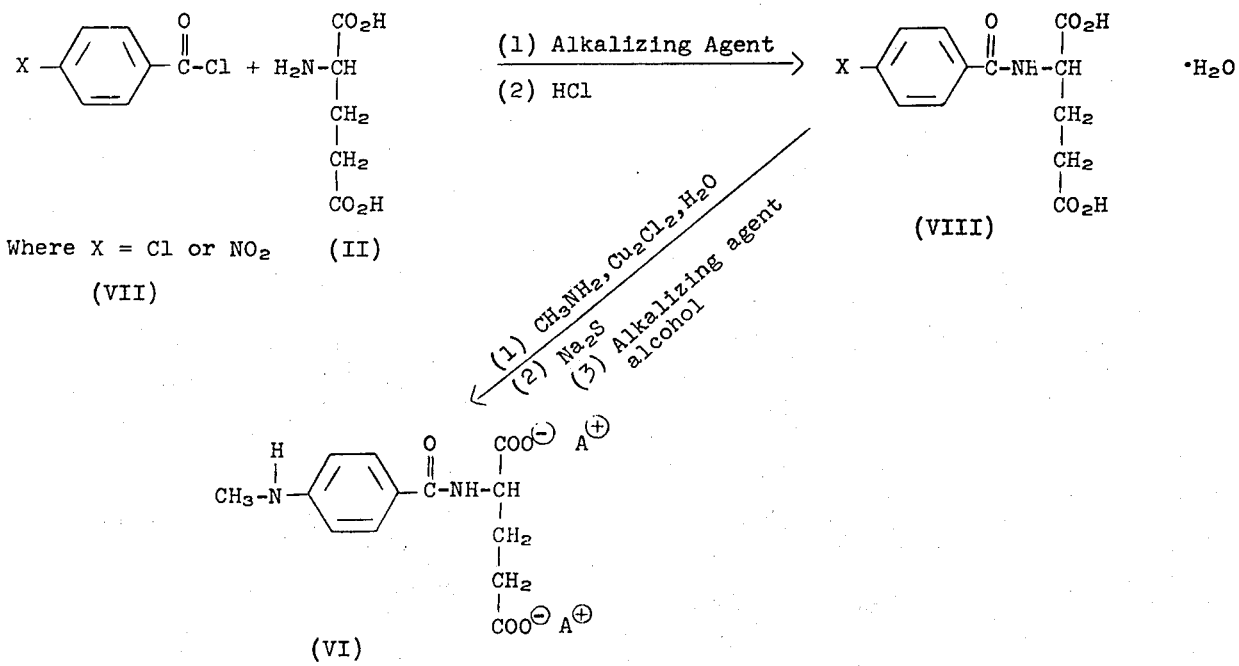

where $A^\oplus$ is a member of the group consisting of $Na^\oplus$, $K^\oplus$, $Ca^{\oplus\oplus} 1/2$, and $Ba^{\oplus\oplus} 1/2$.

In the latter Flow Sheet II, the term alkalizing agent is defined as an aqueous solution of an acid-binding agent such as aqueous caustic soda, potassium hydroxide, calcium hydroxide, potassium carbonate, or sodium carbonate, and the like.

In the improved method of this invention commercially available p-nitro, or p-chlorobenzoyl chloride is added to from about 5 to about 15% molar excess, preferably from about 8 to about 12% molar excess, of monosodium glutamate monohydrate in an aqueous alkali solution, preferably aqueous caustic soda, at a pH from about 8 to about 11, preferably at a pH from moved from the autoclave and treated with an inorganic sulfide, such as hydrogen sulfide sodium sulfide, potassium sulfide, and the like, to precipitate copper from solution as copper sulfide which is then separated from the reaction mixture by filtration. The resulting aqueous filtrate is treated with an alkalizing agent, such as potassium hydroxide, sodium hydroxide, calcium hydroxide, barium hydroxide, and the like; to adjust the pH to about 10 to 14, preferably a pH about 12; the preferred alkalizing agent is sodium hydroxide. The resulting solution is then concentrated to remove excess methylamine and form a concentrate containing the alkali salt of p-methylaminobenzoylglutamic acid, preferably the disodium salt. The latter compound (VI) is then precipitated by admixing from about 8 to about 20 parts by volume, preferably from about 10 to about 15 parts by volume of an alcohol per part by volume of concentrate.

The term admixing, as used herein, means that the alcohol may be added to the concentrate, or the concentrate may be added to the alcohol, and the mixture is stirred until uniform in appearance.

Alcohols which may be used in the method of this invention include methanol, ethanol, isopropanol, and the like. The preferred alcohol is denatured ethanol.

Upon admixing the resulting precipitate is separated by filtration and dried to obtain the product (VI).

The improved method of this invention results in a much higher yield of p-methylaminobenzoylglutamic acid, about 54% overall yield, versus about 30% overall yield for the prior art, based on glutamic acid. In addition to the increased overall yield the improved method eliminates two steps from the prior art method, the reduction of p-nitrobenzoylglutamic acid (III) to p-aminobenzoylglutamic acid (IV) and the conversion of the latter compound to p-iodobenzoylglutamic acid (V).

DETAILED DESCRIPTION

The following examples illustrate the prior art method as well as the improved method of the present invention. All parts and percentages herein are by weight unless otherwise indicated.

EXAMPLE 1–4

The following examples illustrate the prior art method for the preparation of disodium p-methylaminobenzoylglutamate.

EXAMPLE 1

Preparation of p-Nitrobenzoylglutamic Acid

An amount of 96.2 g (0.5184 mole) of p-nitrobenzoyl chloride is reacted with 106.5 g. (0.5691 mole) of monosodium glutamate in the presence of sodium hydroxide at 25°–30°C. to give upon acidification p-nitrobenzoylglutamic acid which is isolated by filtration.

EXAMPLE 2

Preparation of the Zinc Salt of p-Aminobenzoylglutamic acid

The wet cake from Example 1 is reduced with zinc and hydrochloric acid in an aqueous solution at 70°–75°C. for a period of 1.5 to 2 hours to obtain 100 g. of the zinc salt of p-aminobenzoylglutamic acid. The overall yield of (IV) from starting p-nitrobenzoyl chloride is 58.5%.

EXAMPLE 3

Preparation of p-Iodobenzoylglutamic Acid

An amount of 109.1 g. (0.331 mole) of the zinc salt of p-aminobenzoylglutamic acid is diazotized in aqueous solution with sodium nitrite and the diazonium salt is reacted in situ with potassium iodide to form 100 g. (80.1% yield) of p-iodobenzoylglutamic acid.

EXAMPLE 4

Preparation of Disodium p-Methylaminobenzoylglutamate Acid

An amount of g. b. (0.284 mole) of p-iodobenzoylglutamic acid is autoclaved with methylamine in the presence of copper in aqueous sodium hydroxide at 125°C. for 3 hours at a pH of 11 to 13, the autoclave is then vented and the reaction mixture is removed and filtered. The filtrate is concentrated under reduced pressure to remove excess methylamine and diluted with ethanol to precipitate the product which is isolated by filtration. There is obtained 60 g. of product which represents an overall yield of 30.5% based on p-nitrobenzoyl chloride.

EXAMPLES 5–6

The following examples illustrate the preparation of disodium p-methylaminobenzoylglutamate by the improved process of this invention.

EXAMPLE 5

Preparation of p-Chlorobenzoylglutamic Acid Monohydrate

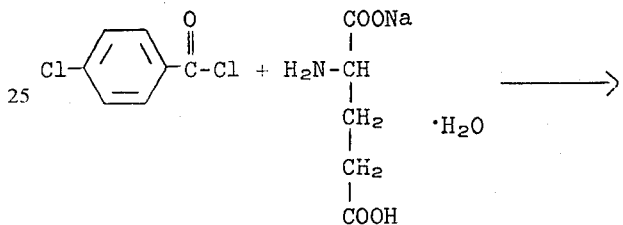

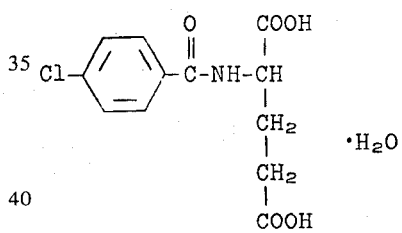

To a beaker containing 400 ml. of water, a stirrer and a thermometer is added 83 g. (0.444 mole) of monosodium glutamate monohydrate and the pH of the mixture is adjusted to 9.0–9.5 by the addition of 50% caustic soda. The mixture is cooled to 15°C. and 71 g. (0.410 mole) of p-chlorobenzoyl chloride is then added thereto while warming slowly to 25°–30°C. and adding caustic soda dropwise as needed to maintain the pH at 9.0 to 9.5. The addition of the caustic soda requires about 1 hour.

The reaction mixture is then maintained at 25°–30°C. and pH 9–9.5 for a period of 2 hours with occasional addition of 50% aqueous caustic. The reaction mixture is then stirred with 4 g. of activated charcoal for 0.5 hour at 25°–30°C., 4 g. of filter aid is added and the mixture is filtered. The filtrate is acidified with conc. hydrochloric acid to adjust the pH to below 3, the resulting slurry is cooled below 10°C. and the white solid is separated by filtration and washed with cold water. The product is dried to obtain 115.7 g. of p-chlorobenzoylglutamic acid monohydrate which represents a yield of 92.9%.

A 10.0 g. portion of the crude product is recrystallized from 150 ml. of deionized water to obtain 8.7 g. of product which in turn is recrystallized from 130 ml.

of deionized water to obtain 6.7 g. of analytically pure material. Calculated for $C_{12}H_{14}NClO_6$: C, 47.45; H, 4.64; N, 4.61; Cl, 11.6: Found: C, 47.42; H, 4.35; N, 4.65; Cl, 12.01.

EXAMPLE 6

Preparation of Disodium p-Methylaminobenzoylglutamate from p-Chlorobenzoylglutamic Acid

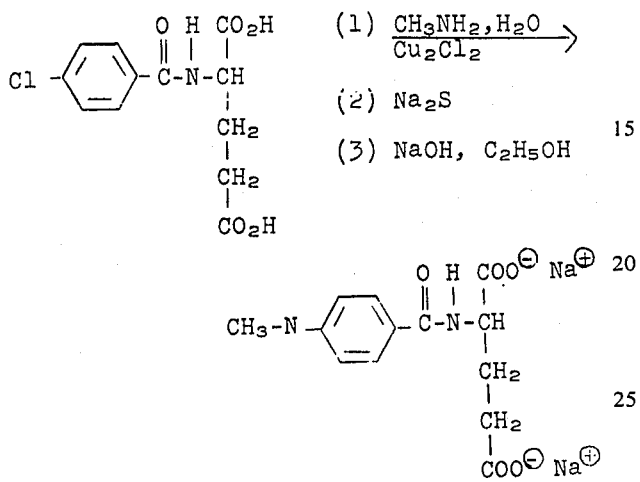

To 5.0 g. (0.0164 mole) of p-chlorobenzoylglutamic acid monohydrate from Example 5 is added 9.0 g. (0.10 mole) of a 40% aqueous solution of methylamine and the mixture is shaken to effect complete solution of the p-chlorobenzoylglutamic acid monohydrate. To the reaction mixture is added 0.65 g. of finely pulverized cuprous chloride and the mixture is again shaken to effect complete solution. The reaction mixture is then added to an autoclave using 1.0 g. (0.015 mole) of 40% aqueous methylamine to rinse the last portion into the autoclave, the autoclave is sealed, and the reaction mixture is heated at 125°–127°C. for 7 hours. The autoclave is then cooled to room temperature, vented, and the contents, are removed and finally rinsed therefrom with water into the reaction mixture. To the reaction mixture plus rinsings is added 0.87 g. (0.011 mole) of sodium sulfide and the mixture is stirred until the blue color is discharged. To the reaction mixture is added a filter aid and the mixture is stirred for 5 minutes and filtered. The filter cake is washed with distilled water and the combined filtrate plus washings is added 3.94 g. (0.049 mole) of 50% aqueous sodium hydroxide. The filtrate is then concentrated under reduced pressure to a final volume of about 18 mls. which is then added to 200 mls. of absolute ethanol and the resulting mixture is stirred until precipitation is completed. The precipitate is then separated by filtration, washed with absolute ethanol and dried in a vacuum oven to obtain 4.9 g. of a crude product which analyzes for 3.25 g. of disodium p-methylaminobenzoylglutamate representing a 61% yield. The overall yield from p-chlorobenzoyl chloride is about 57%.

EXAMPLE 7

The procedure of Example 6 is used except that 1.32 g. (0.033 mole) of sodium hydroxide is added to the mixture before autoclaving. A similar result is obtained.

The above example demonstrates a modification of the method of this invention wherein the autoclave reaction is carried out in the presence of sodium hydroxide.

EXAMPLE 8

The procedure of Example 6 is used except that 200 ml. of isopropyl alcohol is added to the concentrate to precipitate disodium p-methylaminobenzoylglutamate. A similar result is obtained.

The above example illustrates the use of isopropyl alcohol to precipitate the salt compound (VI).

EXAMPLE 9

The procedure of Example 6 is used except that after autoclaving the copper is precipitated by passing hydrogen sulfide into the reaction mixture to precipitate copper sulfide, calcium hydroxide is used to adjust the pH of the filtrate to about 11 to 13, and the calcium salt is precipitated by adding the concentrate to methanol. A similar result is obtained.

The above example illustrates the preparation of the calcium salt of p-methylaminobenzoylglutamic acid.

EXAMPLE 10

The procedure of Example 6 is carried out except that 7.78 g. (0.0247 mole) of barium hydroxide is charged to the autoclave together with the other starting materials and hydrogen sulfide gas is used to precipitate the copper as copper sulfide. The barium salt of p-methylaminobenzoylglutamic acid in a similar amount is obtained as a white solid by adding 200 ml. of absolute ethanol to the concentrate.

EXAMPLE 11

This example illustrates the preparation of the dipotassium salt of p-methylaminobenzoylglutamic acid.

Using a method similar to Example 6, except that copper sulfide is precipitated by passing hydrogen sulfide into the reaction mixture, the filtrate obtained upon separating the copper sulfide is alkalized by adding thereto a solution of 2.95 g. (0.052 mole) of potassium hydroxide in 3 ml. of water, and the concentrate is added to 200 ml. of isopropyl alcohol to precipitate the dipotassium p-methylaminobenzoylglutamate as a white solid. The yield obtained is similar.

EXAMPLE 12

The following example illustrates the preparation of the disodium salt of p-methylaminobenzoylglutamic acid from p-nitrobenzoylglutamic acid.

When the process of Example 6 is used and substituting p-nitrobenzoylglutamic acid for p-chlorobenzoylglutamic acid monohydrate, a similar yield is obtained.

I claim:
1. An improved method for preparing an alkali salt of p-methylaminobenzoylglutamic acid comprising (1) reacting and aqueous mixture of p-nitro, or p-chlorobenzoyl chloride and a salt of glutamic acid under alkaline conditions at a temperature of 20° to 40°C. to produce the corresponding alkali salt of p-chlorobenzoylglutamic acid, (2) acidifying the reaction mixture to precipitate p-nitro, or p-chlorobenzoylglutamic acid, (3) separating the latter compound by filtration, (4) reacting said p-nitro, or p-chlorobenzoylglutamic acid with an aqueous solution containing an excess of methylamine and cuprous chlo- ride at a temperature of from 115°C. to 150°C. in a closed vessel to obtain a reaction mixture containing a salt of p-methylaminobenzoylglutamic acid, (5) treating said reaction mixture with an inorganic sulfide to precipitate the copper as copper sulfide, (6) separating said copper sulfide from the reaction mixture, (7) treating the reaction mixture with an alkalizing agent to form the alkali salt of p-methylaminobenzoylglutamic acid and (8) recovering said compound therefrom.

2. A method for preparing an alkali salt of p-methylaminobenzoylglutamic acid comprising (1) reacting an aqueous mixture of one mole of p-nitro, or p-chlorobenzoyl chloride and from about 1.05 to about 1.15 moles of a salt of glutamic acid at an alkaline pH and a temperature from about 20°C. to about 40°C. for a period from about 1 to about 5 hours to obtain a salt of p-chlorobenzoylglutamic acid, (2) acidifying to a pH of about 3, (3) separating the resulting precipitated p-nitro, or p-chloro benzoylglutamic acid by filtration, (4) reacting an aqueous mixture of about one mole of said p-nitro, or p-chlorobenzoylglutamic acid with about 5 to about 15 moles of methylamine and from about 0.2 to about 0.8 mole of cuprous chloride at a temperature from about 115° to about 150°C. for a period from about 5 to about 10 hours to obtain a salt of p-methylaminobenzoylglutamic acid, (5) treating the reaction mixture with an inorganic sulfide to precipitate copper sulfide, (6) separating the copper sulfide therefrom by filtration, (7) treating the resulting filtrate with an alkalizing agent to obtain an alkali p-methylaminobenzoylglutamate, (8) concentrating the reaction mixture to remove excess methylamine, (9) admixing said concentrate with an alcohol to precipitate the alkali p-methylaminobenzoylglutamate and (10) recovering said compound by filtration.

3. A method according to claim 2 wherein said salt of glutamic acid is monosodium glutamate monohydrate.

4. A method according to claim 1 wherein said inorganic sulfide is sodium sulfide.

5. A method according to claim 2 wherein said alkalizing agent is sodium hydroxide.

6. A method according to claim 2 wherein the alcohol is ethyl alcohol.

7. A method according to claim 2 wherein from about 8 to about 20 parts by volume of ethyl alcohol are admixed with one part by volume of said concentrate.

8. A method according to claim 1 wherein the starting material is p-nitrobenzoyl chloride.

* * * * *

UNITED STATES PATENT OFFICE
CERTIFICATE OF CORRECTION

PATENT NO. : 3,892,801
DATED : July 1, 1975
INVENTOR(S) : John Kazan

It is certified that error appears in the above-identified patent and that said Letters Patent are hereby corrected as shown below:

Column 3, line 18, delete "l-glutamate,".

Column 6, line 1, "g.b." should read -- 107.3 g. --.

Column 7, line 2, "$C_{12}H_{14}NclO_6$" should read -- $C_{12}H_{14}NClO_6$ --.

Column 8, line 60, "and" should read -- an --.

Signed and Sealed this sixteenth Day of September 1975

[SEAL]

Attest:

RUTH C. MASON
Attesting Officer

C. MARSHALL DANN
Commissioner of Patents and Trademarks